Patented Apr. 16, 1935

1,997,610

UNITED STATES PATENT OFFICE 1,997,610

PROCESS OF PRODUCING N-DIHYDRO-1,2,1',2'-ANTHRAQUINONE-AZINE AND ITS DERIVATIVES

Merville S. Thompson, deceased, late of Pennsgrove, N. J., by Marian Clough Thompson, executrix, Media, Pa., assignor to E. I. du Pont de Nemours & Company, Wilmington, Del., a corporation of Delaware No Drawing. Application April 2, 1930, Serial No. 441,174

35 Claims. (Cl. 260—31)

This invention relates to the production of N-di-hydro-1,2,1',2'-anthraquinone-azine (indanthrone) and its derivatives. It relates to the production of this compound from beta-amino-anthraquinone and more particularly to the process of treating beta-amino-anthraquinone with a caustic alkali fusion.

It is known that the presence of an oxidizing agent in the fusion of beta-amino-anthraquinone with a caustic alkali improves the yield of the dyestuffs to which this invention relates. See "Anthracene and Anthraquinone" by Barnett (1921) page 345. Other methods of improving the yields of this process have been devised by Pope, U. S. Patent 1,451,270, April 10, 1923, and Thompson, U. S. Patents 1,580,700, April 13, 1926 and 1,731,800, October 15, 1929. Each of these improvements may be used separately or in conjunction with the oxidizing agent improvement mentioned above. Pope's improvement consisted in carrying out the fusion in the presence of a salt of an organic acid, the salt being of a type miscible in the fused state with the alkali, for example, potassium formate or potassium acetate. Thompson's improvement comprised carrying out the fusion in the presence of an organic hydroxylate of a metal, particularly organic alkali metal hydroxylates. Representative compounds in this process were sodium methylate, sodium ethylate, sodium butylate, sodium phenolate, and sodium cresolate. In general greater yields of the product are obtained when the process is carried out according to Thompson's procedure than when Pope's method is used.

It is an object of this invention to devise an improved process for the manufacture of N-dihydro - 1,2,1',2' - anthraquinone-azine. Another object is to improve the physical properties of the melt used for the treatment of beta-amino-anthraquinone in the production of N-dihydro-1,2,1',2'-anthraquinone-azine and specifically to produce greater fluidity and smoothness in said melt. Still further objects will appear hereinafter.

These objects are accomplished by the present invention by which it has been found that in the process of fusing beta-amino-anthraquinone or a derivative thereof with caustic potash or with a mixture of caustic potash and caustic soda higher yields of N-di-hydro-1,2,1',2'-anthraquinone-azine or its derivatives are obtained when the reaction is carried out in the presence of a salt of an organic acid and an organic alkali metal hydroxylate than are obtained in their absence or in the presence of either one separately. The invention will be more fully understood from a consideration of the following examples:

Example 1

A mixture of potassium hydroxide (450 grams) and sodium hydroxide (150 grams) is fused and cooled to about 220° C. Anhydrous sodium acetate (40 grams) is then added under agitation; and, as soon as the temperature has fallen to about 205° C., potassium chlorate (23 grams) is also added. The temperature is then adjusted to 195-200° C. and a mixture of powdered sodium phenolate (50 grams) and powdered 2-amino-anthraquinone (120 grams) is added at such a rate as to maintain the temperature at 195-200° C. The melt is further stirred for one-half hour at about 200° C., after which the temperature is rapidly raised to about 220° C. and maintained for one-half hour at that temperature. The melt is then drowned in ten liters of cold, distilled water, the slurry agitated vigorously, heated to at least 80° C. and air is blown through the suspension until no further oxidation occurs and the dyestuff is completely precipitated. Finally the oxidized dyestuff is filtered off, washed alkali-free and dried.

Example 2

A mixture of potassium hydroxide (450 grams) and sodium hydroxide (150 grams) is fused and allowed to cool under agitation to 210° C. Anhydrous sodium acetate (40 grams) is then added and followed, as soon as the temperature has dropped to 195-200° C., by an intimate mixture of 2-amino-anthraquinone (120 grams) and sodium phenolate (50 grams). The temperature is maintained at 195-200° C. and the addition is somewhat slower than in Example 1 because the resulting melt is somewhat thicker than in that example. The melt is stirred one-half hour at about 200° C., heated gradually to about 220° C. and drowned in cold water. The dyestuff is isolated as in Example 1.

Example 3

A mixture of potassium hydroxide (450 grams) and anhydrous sodium acetate (50 grams) is melted over a free flame and then placed in an oil bath previously heated to about 200° C. When the melt has cooled, under agitation, to about 250° C., potassium phenolate (50 grams) is slowly added. The temperature is allowed to drop further and sodium chlorate (20 grams) is added at about 210° C. 2-amino-anthraquinone (120 grams) is then added in small portions, keeping the temperature as near 200° C. as possible. After the β-amino-anthraquinone has been absorbed by the melt, the temperature is gradually raised to 220° C., held at about 220° C. for one-half hour, the charge drowned, and the dyestuff isolated in the usual manner.

*Example 4*

A mixture of potassium hydroxide (450 grams) and sodium hydroxide (150 grams) is fused at 250° C., cooled to 210° C. and potassium formate (40 grams) added. Immediately thereafter potassium chlorate (23 grams) is added and, as soon as the temperature has dropped to 195° C., an intimate mixture of 2-amino-anthraquinone (120 grams) and sodium phenolate (50 grams) is added at such a rate that the temperature is maintained at 195–200° C. Thereafter, the charge is heated rapidly to 215° C. and drowned in ten liters of distilled water and the dyestuff isolated as usual.

*Example 5*

A molten mixture of anhydrous sodium acetate (40 grams), sodium hydroxide (150 grams) and potassium hydroxide (450 grams) is cooled under agitation to about 210° C. Sodium chlorate (20 grams) is then added, followed at once by sodium cresolate (50 grams). Regulating the temperature at 195–200° C., 2-amino-anthraquinone (120 grams) is added in small portions and the melt held at 200° C. for one-half hour longer, then heated to about 220° C. in the course of an hour, and drowned in the usual manner.

Although it is desirable to employ an oxidizing agent in the caustic melt in order to realize a maximum yield of indanthrone, the beneficial effect of the combinations mentioned above are in no way dependent upon such an agent, as will be clear from Example 2. It is not necessary that the melt comprise both potassium and sodium hydroxides since potassium hydroxide alone is sufficient as indicated by Example 3. Various organic salts and hydroxylates may be used as indicated by the above examples. Considerable variation is permissible in the sequence of the addition of the materials to the melt. For instance, the sodium or potassium phenolates or cresolates used in the above may be produced separately and mixed with the 2-amino-anthraquinone in the dry state or a mixture of the sodium or potassium hydroxide, phenolic body, 2-amino-anthraquinone, and water may be evaporated in vacuo to give an intimate mixture of the desired materials. The temperature of the melt and the quantity of the oxidizing agent used may be widely varied. The oxidizing agent may be added at any preferred time to the melt. The same is true for the beta-amino-anthraquinone. The amount of beta-amino-anthraquinone can also be widely varied but the examples indicate the preferred proportions.

In regard to the increase in yield of indanthrone brought about by the combination of materials of this invention, it may be said that the use of the combination gives approximately 10% greater yields than would be expected from the effect of either material when used separately. For example, the yield of indanthrone produced according to Example 1 above, is approximately 55% of the theoretical amount. The use of sodium acetate alone gives no more than 48% and sodium phenolate alone no more than 51% of a theoretical amount, even when used in high proportions in the melt. It would naturally be expected that by combining the two materials the mean of their percentages, that is 49.5%, would be the yield. The advantages of this invention and the unexpected yields produced will be clear from the above description. In the claims wherein the names N-di-hydro-1,2,1',2'-anthraquinone-azine or indanthrone occur it is intended to include the derivatives of this compound. In the claims wherein the names beta-amino-anthraquinone or 2-amino-anthraquinone occur it is intended to include the derivatives of this compound which react similarly in this process.

As many apparently widely different embodiments of this invention may be made without departing from the spirit and scope thereof, it is to be understood that the invention is not limited to the specific embodiments thereof except as defined in the appended claims.

What is claimed is:

1. The process of producing N-di-hydro-1,2, 1'2'-anthraquinone-azine which comprises fusing a mixture of potassium and sodium hydroxides, sodium acetate, adding an alkali metal chlorate, adding an alkali metal phenolate, adding beta-amino-anthraquinone, drowning the melt in water and isolating the dyestuff.

2. In the process of producing indanthrones, the step of fusing beta-amino-anthraquinone with caustic alkali in the presence of an organic carboxylic acid salt of the fatty acid series and an alkali metal phenyl hydroxylate.

3. In the process of producing indanthrones, the step of fusing beta-amino-anthraquinone with caustic alkali in the presence of an organic carboxylic acid salt of the fatty acid series and an alkali metal phenolate.

4. In the process of producing indanthrones, the step of fusing beta-amino-anthraquinone with caustic alkali in the presence of an organic carboxylic acid salt of the fatty acid series and sodium phenolate.

5. The process comprising treating beta-amino-anthraquinone with an organic alkali metal phenolate and an alkali metal organic carboxylic acid salt of the fatty acid series in the presence of a fused alkali metal hydroxide.

6. The process comprising treating beta-amino-anthraquinone with an organic alkali metal phenolate and an alkali metal saturated fatty acid salt in the presence of a fused alkali metal hydroxide.

7. The process comprising treating beta-amino-anthraquinone with an organic alkali metal phenolate and sodium acetate in the presence of a fused alkali metal hydroxide.

8. The process of production of N-di-hydro-1,2,1',2'-anthraquinone-azines comprising treating a beta-amino-anthraquinone with a melt including potassium hydroxide, sodium hydroxide, an organic carboxylic acid salt of the fatty acid series, an oxidizing agent and an alkali-metal-phenyl-hydroxylate.

9. The process of production of N-di-hydro-1,2,1',2'-anthraquinone-azines comprising treating a beta-amino-anthraquinone with a melt including potassium hydroxide, sodium hydroxide, an organic carboxylic acid salt of the fatty acid series, an oxidizing agent and sodium-phenyl-hydroxylate.

10. The process of production of N-di-hydro-1,2,1',2'-anthraquinone-azines comprising treating a beta-amino-anthraquinone with a melt including a mixture of alkali metal hydroxides, an organic carboxylic acid salt of the fatty acid series, an alkali metal chlorate and an organic alkali metal phenolate.

11. The process of production of N-di-hydro-1,2,1',2'-anthraquinone-azines comprising treating a beta-amino-anthraquinone with a melt including potassium hydroxide, an organic carboxylic acid salt of the fatty acid series, an alkali metal chlorate and an organic alkali metal phenolate.

12. The process of producing N-di-hydro-1,2,1',2'-anthraquinone-azine which comprises fusing a mixture of about 450 grams of potassium hydroxide and 150 grams of sodium hydroxide, adjusting the temperature to about 220° C., adding about 40 grams of anhydrous sodium acetate to the melt, afterwards when the temperature has fallen to about 205° C., adding about 23 grams of potassium chlorate, then adjusting the temperature to about the range 195–200° C., adding a mixture of about 50 grams of powdered sodium phenolate and about 120 grams of powdered beta-amino-anthraquinone at such a rate that the temperature is maintained at about 195–200° C., continuing the heating for about one-half hour at about 200° C., rapidly raising the temperature to 220° C., and maintaining it for about one-half hour, then drowning the melt in about ten liters of cold distilled water, agitating the resulting slurry vigorously and heating it to about 80° C. and blowing air through it until no further oxidation occurs and the dyestuff is completely precipitated and finally separating and washing the dyestuff.

13. The process comprising treating beta-amino-anthraquinone with a caustic alkali fusion containing potassium hydroxide, in the presence of an alkali metal formate and an alkali metal derivative of a hydroxy benzene.

14. The process comprising treating beta-amino-anthraquinone with a caustic alkali fusion containing potassium hydroxide, in the presence of an alkali metal acetate and an alkali metal derivative of a hydroxy benzene.

15. The process comprising treating beta-amino-anthraquinone with a caustic alkali fusion containing potassium hydroxide, in the presence of an alkali metal salt of a fatty acid and an alkali metal phenolate.

16. The process comprising treating beta-amino-anthraquinone with a caustic alkali fusion containing potassium hydroxide, in the presence of an alkali metal salt of a fatty acid and an alkali metal cresolate.

17. The process comprising fusing caustic alkali including potassium hydroxide, adding an alkali metal salt of a fatty acid, adding an oxidizing agent and thereafter adding a mixture of a beta-amino-anthraquinone and an alkali metal derivative of a hydoxy benzene.

18. The process comprising fusing caustic alkali including potassium hydroxide, adding an alkali metal derivative of a hydroxy benzene, adding an oxidizing agent and thereafter adding a mixture of a beta-amino-anthraquinone and an alkali metal salt of a fatty acid.

19. The process comprising fusing caustic alkali including potassium hydroxide, adding an alkali metal salt of a fatty acid, and thereafter adding a mixture of a beta-amino-anthraquinone and an alkali metal derivative of a hydroxy benzene.

20. The process comprising fusing caustic alkali including potassium hydroxide, adding an alkali metal derivative of a hydroxy benzene, and thereafter adding a mixture of a beta-amino-anthraquinone and an alkali metal salt of a fatty acid.

21. The process comprising fusing potassium hydroxide and an alkali metal salt of a fatty acid, adding an alkali metal derivative of a hydroxy benzene, adding an oxidizing agent and thereafter adding a beta-amino-anthraquinone.

22. The process comprising fusing potassium hydroxide and an alkali metal derivative of a hydroxy benzene, adding an alkali metal salt of a fatty acid, adding an oxidizing agent and thereafter adding a beta-amino-anthraquinone.

23. The process comprising fusing caustic alkali including potassium hydroxide and an alkali metal salt of a fatty acid, adding an oxidizing agent, adding an alkali metal derivative of a hydroxy benzene and thereafter adding a beta-amino-anthraquinone.

24. The process comprising fusing caustic alkali including potassium hydroxide and an alkali metal derivative of a hydroxy benzene, adding an oxidizing agent, adding an alkali metal salt of a fatty acid and thereafter adding a beta-amino-anthraquinone.

25. The process of producing N-dihydro-1,2,1',2'-anthraquinone-azines which comprises subjecting a 2-amino-anthraquinone to the action of a caustic alkali melt in the presence of a salt of a fatty acid in conjunction with an organic-alkali-metal-hydroxylate of the benzene series.

26. The process of producting N-dihydro-1,2,1',2'-anthraquinone-azines which comprises subjecting a 2-amino-anthraquinone to the action of a caustic alkali melt in the presence of a salt of a low fatty acid in conjunction with an organic-alkali-metal-hydroxylate of the benzene series.

27. The process of producing N-dihydro-1,2,1',2'-anthraquinone-azines which comprises subjecting a 2-amino-anthraquinone to the action of a caustic alkali melt in the presence of a salt of a fatty acid in conjunction with an alkali metal phenolate.

28. The process of producing N-dihydro-1,2,1',2'-anthraquinone-azines which comprises subjecting a 2-amino-anthraquinone to the action of a caustic alkali melt in the presence of a salt of a low fatty acid in conjunction with an alkali metal phenolate.

29. In the process of producing indanthrones, the step of fusing beta-amino-anthraquinone with caustic alkali in the presence of an organic carboxylic acid salt of the saturated lower fatty acid series and an organic alkali metal phenolate.

30. In the process of producing indanthrones, the step of fusing beta-amino-anthraquinone with caustic alkali in the presence of an organic carboxylic acid salt of the saturated lower fatty acid series and sodium phenolate.

31. The process comprising treating beta-amino-anthraquinone with an organic alkali metal phenolate and an alkali metal organic carboxylic acid salt of the saturated lower fatty acid series in the presence of a fused alkali metal hydroxide.

32. The process of production of N-di-hydro-1,2,1',2'-anthraquinone-azines comprising treating a beta-amino-anthraquinone with a melt including potassium hydroxide, sodium hydroxide, an organic carboxylic acid salt, of the saturated lower fatty acid series, an oxidizing agent and an alkali-metal-phenolate.

33. The process of production of N-di-hydro-1,2,1',2'-anthraquinone-azines comprising treating a beta-amino-anthraquinone with a melt including potassium hydroxide, sodium hydroxide, an organic carboxylic acid salt, of the saturated lower fatty acid series an oxidizing agent and sodium-phenolate.

34. The process of production of N-di-hydro-1,2,1',2'-anthraquinone-azines comprising treating a beta-amino-anthraquinone with a melt including a mixture of alkali metal hydroxides, an organic carboxylic acid salt, of the saturated lower fatty acid series, an alkali metal chlorate and an organic alakil metal phenolate.

35. The process of production of N-di-hydro-1,2,1',2'-anthraquinone-azines comprising treating a beta-amino-anthraquinone with a melt including potassium hydroxide, an organic carboxylic acid salt of the saturated lower fatty acid series, an alkali metal chlorate and an organic alkali metal phenolate.

MARIAN CLOUGH THOMPSON.
*Executrix of the Estate of Merville S. Thompson, deceased.*